United States Patent [19]

Tseng et al.

[11] Patent Number: 5,431,264
[45] Date of Patent: Jul. 11, 1995

[54] ELECTRIC VEHICLE HAVING BODY-WOUND INDUCTIVE COIL AND EMR SHIELDING

[76] Inventors: Ling-Yuan Tseng, 5th Floor, 1-1 Lane 3, Alley 12, Chinhwa St., Chinmei, Taipei, Taiwan, 11708; David Tseng, 2123 Flintmore Ct., San Jose, Calif. 95148

[21] Appl. No.: 202,591

[22] Filed: Feb. 28, 1994

Related U.S. Application Data

[62] Division of Ser. No. 922,741, Jul. 31, 1992, Pat. No. 5,311,973.

[51] Int. Cl.⁶ .............................. B60L 9/16; H05K 9/00
[52] U.S. Cl. .................................... 191/10; 104/281; 174/35 R
[58] Field of Search ................ 191/10; 104/281, 286, 104/292, 304; 180/2.1; 174/35 R

[56] References Cited

U.S. PATENT DOCUMENTS 4,331,225  5/1982  Bolger ............................ 191/10
5,213,046  5/1993  Proise ............................ 104/281
5,253,591  10/1993  Rote et al. .................... 104/281

FOREIGN PATENT DOCUMENTS 0016725  2/1977  Japan ............................ 191/10
0016726  2/1977  Japan ............................ 191/10

*Primary Examiner*—Michael S. Huppert
*Assistant Examiner*—Scott L. Lowe
*Attorney, Agent, or Firm*—Burns, Doane, Swecker & Mathis

[57] ABSTRACT

An electric vehicle having a non-metallic body portion and equipped with an inductive charging coil for charging the vehicle's battery while the electric vehicle is moving includes a magnetic flux barrier attached to the non-metallic body portion and encompassing a passenger compartment of the electric vehicle for resisting penetration of magnetic flux into the passenger compartment. The inductive charging coil may be formed of wire wound around the body of the electric vehicle or, alternatively, may be formed of stripes etched on the body surface or of flexible adhesive conductors.

6 Claims, 4 Drawing Sheets

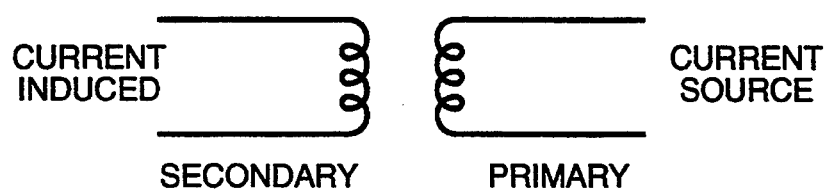
FIG._1
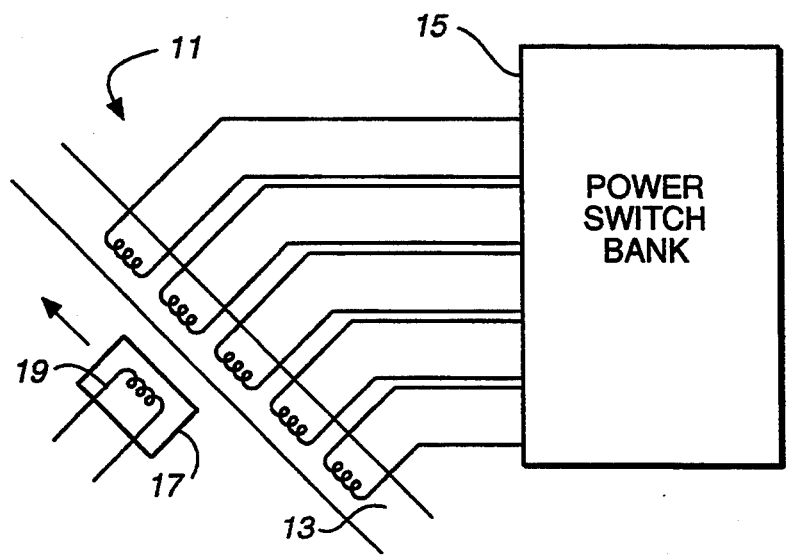
FIG._2

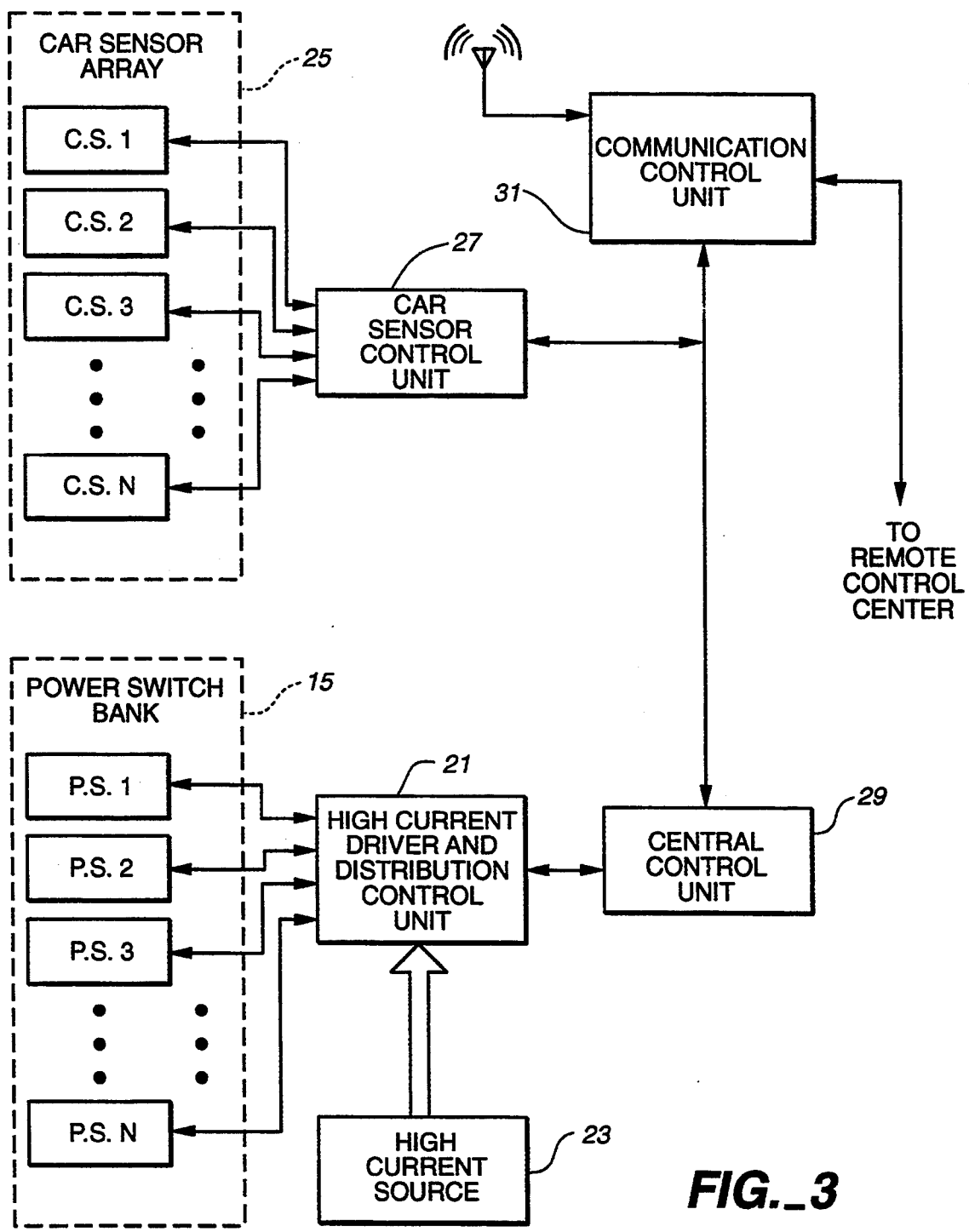
*FIG._3*

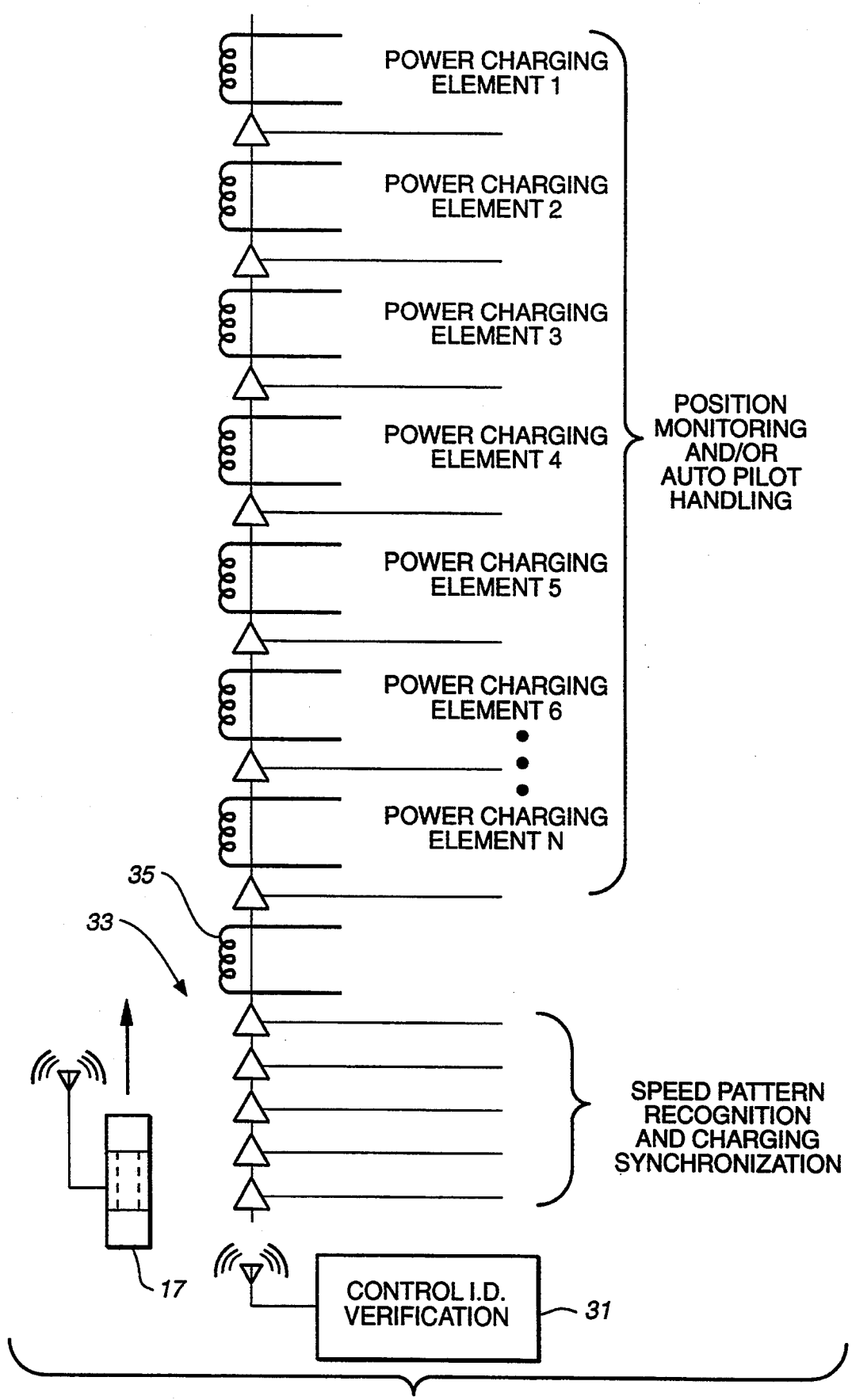
FIG._4

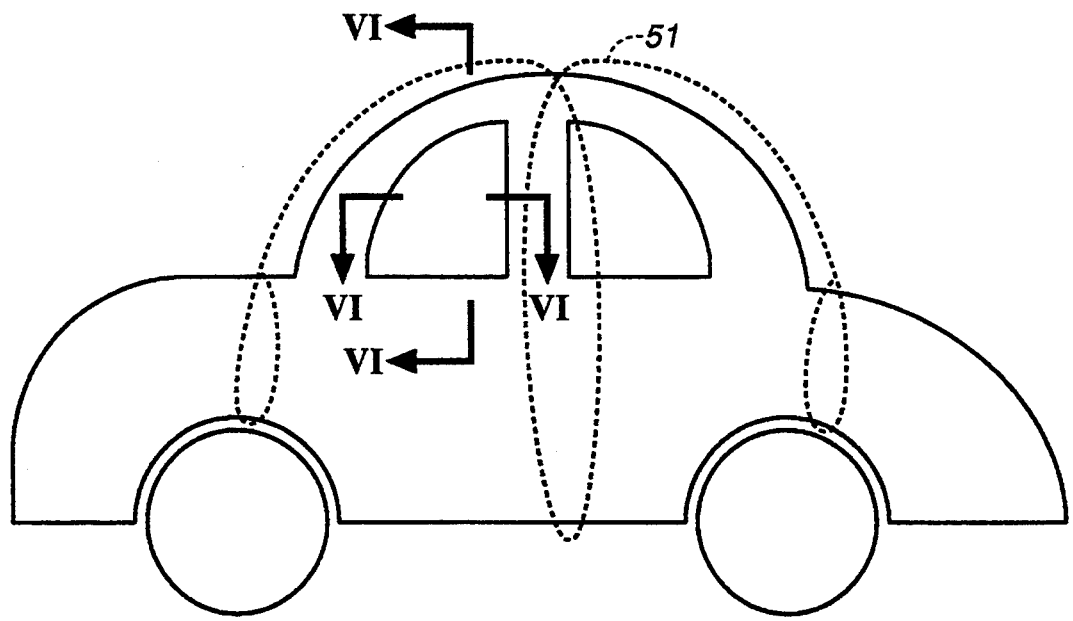
FIG._5
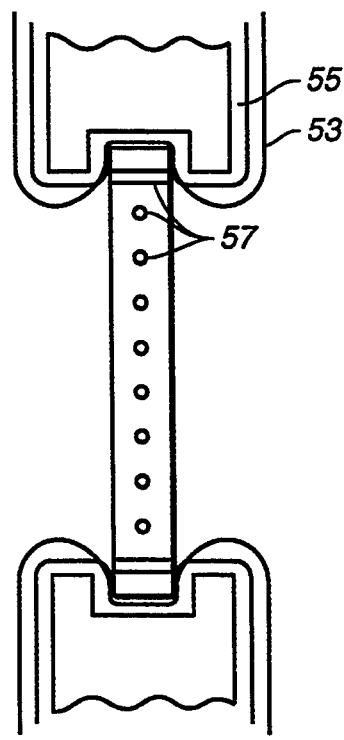
FIG._6

ELECTRIC VEHICLE HAVING BODY-WOUND INDUCTIVE COIL AND EMR SHIELDING

This application is a divisional of application Ser. No. 07/922,741, filed Jul. 31, 1992 now U.S. Pat. No. 5,311,973.

BACKGROUND OF THE INVENTION

1. Field of the Invention

The present invention relates to the recharging of electric cars and more particularly to inductive charging of a moving electric vehicle's battery.

2. State of the Art

In the present era of increased environmental consciousness, considerable attention is being directed toward electric cars as an alternative to conventional cars. Legislation is presently being considered in some jurisdictions that would require a percentage of all new vehicles sold to have no tail pipe emissions. Despite continuing research, however, the range of a typical electrical car is no more than about 60 miles. In many major metropolitan areas where electrical cars are most needed to improve air quality, 60 miles is less than many people's daily commute. Even if the range of electric cars is improved, there will remain a need to provide for recharging of a car's battery away from where the car is garaged.

In contrast to conventional cars for which numerous service stations are conveniently located, for electric cars, the prospects for establishment of numerous electric service stations appear dim. For one thing, since electricity is such a commonly available commodity, the incentive for operating an electric service station is not high. Furthermore, unlike conventional cars which have their tanks quickly filled up, the recharging of an electric car's battery may take a relatively long time. Therefore, electric service stations, besides being impractical because of the amount of space that would be required to accommodate a significant number of vehicles given their charging-time requirements, would also be inconvenient for the driver who would have to wait for the battery to recharge.

The present invention addresses the foregoing difficulties.

SUMMARY OF THE INVENTION

In accordance with the present invention, an electric vehicle having a non-metallic body portion and equipped with an inductive charging coil for charging the vehicle's battery while the electric vehicle is moving includes a magnetic flux barrier attached to the non-metallic body portion and encompassing a passenger compartment of the electric vehicle for resisting penetration of magnetic flux into the passenger compartment. The inductive charging coil may be formed of wire wound around the body of the electric vehicle or, alternatively, may be formed of stripes etched on the body surface or of flexible adhesive conductors.

BRIEF DESCRIPTION OF THE DRAWINGS

FIG. 1 is a simple circuit diagram illustrating inductive coupling;

FIG. 2 is a simplified diagram illustrating one possible implementation of the present invention;

FIG. 3 is a block diagram of an embodiment of the present invention;

FIG. 4 is a simplified diagram illustrating the physical arrangement of certain ones of the devices in FIG. 3

FIG. 5 is a diagram of an electric vehicle in accordance with one embodiment of the present invention; and FIG. 6 is a sectional view of a portion of the electric vehicle of FIG. 5

DETAILED DESCRIPTION OF THE PREFERRED EMBODIMENTS

The supply of power to a device by inductive coupling is well known and is used to advantage in diverse fields ranging from underwater construction to (most recently) artificial heart implants. To achieve inductive coupling of power between physically separate or separable elements, a primary coil is connected to a current source, the flow of current through the primary coil creating a magnetic field surrounding the primary coil. This magnetic field serves as a medium of energy transfer. Current is induced in a secondary coil when turns of the secondary coil cut through imagined lines of flux of the magnetic field. The turns of the secondary coil may be caused to cut through magnetic lines of flux by producing relative motion between the primary and secondary coils as well as by causing the magnetic field to fluctuate using an alternating current source. In the present electric car charging system, the primary coil is stationary and is embedded in a highway embankment or may be buried underground along the highway, for example, whereas the secondary coil is mounted on and moves with an electric vehicle, thereby producing relative motion between the primary and secondary coils. The current source connected to the primary coil may therefore be either a direct current source or an alternating current source.

The aforedescribed arrangement is shown in greater detail in FIG. 2. To allow for sufficient charging time, an array of inductive coils 11 is arrayed along an extended linear distance, for example a distance of one mile, along a highway embankment 13. In order to conserve power and to avoid unnecessary electromagnetic radiation, power to the inductive coils is supplied through a power switch bank 15. As an electric vehicle 17 on which a secondary coil 19 is mounted moves to a position opposite a particular one of the inductive coils as determined by an array of car sensors, that particular inductive coil is energized to create a magnetic field through which the secondary coil 19 moves as the electric vehicle 17 moves. Current is therefore induced in secondary coil 19 and may be used to charge the battery of the electric vehicle 17.

A charging system of the type illustrated in FIG. 2 may be established in an auxiliary outside lane provided for that purpose, similar to a weigh station, for example. Charging service may be provided in exchange for a toll collected as the electrical vehicle approaches the charging station. The toll may be collected in cash or currency or may be collected by token of payment. The token of payment may be an object, for example a coupon, or may be electronic, using a smart card, for example. The latter alternative is presently preferred because it takes advantage of capabilities already being provided as part of the Intelligent Highway Vehicle System (IHVS). Currently in the IHVS, highway condition signaling and toll billing and collection are already being performed via a smart card system. Further convenience of operation may be achieved by providing an electric vehicle with a radio communication system to communicate with the charging system. A charging system in which radio communications may be established between the electric vehicle and the charging system is referred to hereinafter as a Smart Charging System.

Preferably, the electric vehicle is provided with an intelligent battery management control unit that continually monitors the electric vehicle's battery and keeps track of the state of charge of the battery at any given time. When the battery capacity is low, the driver is alerted and information is received from the battery management unit and linked with IHVS if the electric car is equipped with IHVS, with or without intervention of the driver, to learn the distance to the next charging station. When the driver decides to charge the battery, a charging request is transmitted. When IHVS or the smart charging system senses such a request, a service protocol between the electric vehicle and the smart charging system is begun. As previously mentioned, an IC card having a dollar value encoded therein may be used for purchasing charging power. Payment may be also be handled by IHVS in accordance with a prearranged payment method, in which case no card will be required. The following description assumes a prearranged subscription method of payment.

In a preferred embodiment of the smart charging system, shown in FIG. 3, the power switch bank 15 includes N power switches PS1 through PSN and is connected to a high current driver and distribution control unit 21. Current is supplied to the current control unit 21 from a high current source 23. A car sensor array 25 includes a large number of car sensors CS1 through CSN and is connected to a car sensor control unit 27. The car sensor control unit 27 and the current control unit 21 are both connected to a central control unit 29. The central control unit 29 is connected to a communication control unit 31, which is turn connected to a remote control center. The remote control center may be part of or separate from IHVS.

During the service protocol between the electric vehicle and the smart charging system, a charging sequence number of the next smart charging station (SCS) is assigned to the electric vehicle based on how far the electric vehicle is away from the next SCS. The charging sequence number serves as the customer service number for that station. In the control center, all service parameters such as time, date, basic car information (read from the car during protocol set up), location, and amount is recorded and filed under the index of this customer service number. Based on data supplied from the electric vehicle's battery management control unit in the charging request, an electric charging pattern is selected by the central control unit 29, determining one or more charging parameters such as current, voltage, pulse duration, frequency, etc.

Referring to FIG. 4, once the electric vehicle enters the active charging zone, the electric vehicle's customer service number (or customer I.D.) is verified by the central control unit 29 in cooperation with the communication control unit 31. An array of sensors 33 preceding the array of inductive coils is used to more precisely calculate the electric vehicle's speed and location. When the electric vehicle encounters the first charging element 35, the charging procedure will follow exactly the charging pattern determined by the central control unit 29 (FIG. 3). Based on output signals from the car sensors (represented in FIG. 4 by triangles) of the car sensor array 25 (FIG. 3), the control unit 29 tracks the progress of the electric vehicle along the active charging zone. As the secondary coil of the electric vehicle engages each charging element, execution of the charging procedure continues in accordance with instructions issued by the charging control unit.

As shown in FIG. 4, individual ones of the car sensors may be set in between adjacent charging elements. The car sensors provide an accurate trace of the electrical vehicles movement. In order to avoid possible interference caused by the magnetic field of the charging elements, optical-type sensors are preferred. In order to optimize both the moving speed of the electric vehicle and the gap between the electric vehicle and the charging installation, the electric vehicle, if sufficiently sophisticated and intelligent, may include autopilot circuitry. The electric vehicle may then hand over control to the SCS which, by picking up signals from the car sensors, may control the electric vehicle to optimize its moving speed and position.

Referring to FIG. 5, a particularly advantageous way of realizing the secondary coil 19 is to wrap the entire body of an electric vehicle in many turns of thin wire 51 to form a high-efficiency inductance coil capable of generating enough current to charge the battery. As shown in FIG. 6, under the coil layer, in order to prevent passengers and electronic instruments from being affected by the magnetic field of the SCS, a layer of anti-magnetic paint 53 may be applied, followed by a protective metal conduction layer 55 serving as the ground of the entire car. Transparent polymeric conductors 57 may also be embedded in the windows of the electric vehicle and caused to connect to the protective metal layer when the windows are closed, realizing in effect a faraday cage or shield, providing a high level of protection from magnetic fields.

Instead of a coil of thin wire, the coil may also be formed by stripes etched on the electrical vehicle's body surface to create a coil effect, or simply a flexible adhesive module that may be applied to the electric vehicle's body surface.

Safety protection must also be provided for cars not using the SCS service. A metal wall may be used to divide the highway, the outside lane being designated for SCS service and the other lanes for normal through traffic. Proper warning signs and signals should be used along the highway to advise the drivers that they are approaching an SCS area. Warning signals should also be provided alerting pedestrian traffic or persons working in the area of the SCS of possible health hazards.

The foregoing has described the principles, preferred embodiments and modes of operation of the present invention however, the invention should not be construed as limited to the particular embodiments discussed. Instead, the above described embodiments should be regarded as illustrative rather than restrictive, and it should be appreciated that variations may be made in those embodiments by workers skilled in the art without departing from the scope of the present invention as defined by the following claims.

What is claimed is:

1. An electric vehicle comprising a non-metallic body portion, magnetic flux barrier means, attached to said non-metallic body portion and encompassing a passenger compartment of the electric vehicle, for resisting penetration of magnetic flux, and inductive coil means, mounted on said electric vehicle outside of said magnetic flux barrier, for producing an induced electromotive force.

2. The apparatus of claim 1 wherein said magnetic flux barrier comprises a layer of anti-magnetic paint.

3. The apparatus of claim 1 wherein said magnetic flux barrier comprises a metal conduction layer.

4. The apparatus of claim 1 wherein said inductive coil means comprises wire wound around a body of said electric vehicle.

5. The apparatus of claim 1 wherein said inductive coil means comprises stripes etched on a body surface of said electric car.

6. The apparatus of claim 1 wherein said inductive coil means comprises flexible adhesive conductor means.

* * * * *